L. W. CAMPBELL.
PICKER STEM.
APPLICATION FILED MAR. 12, 1915.
1,277,852.
Patented Sept. 3, 1918.
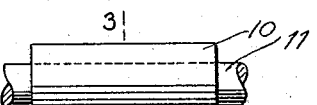
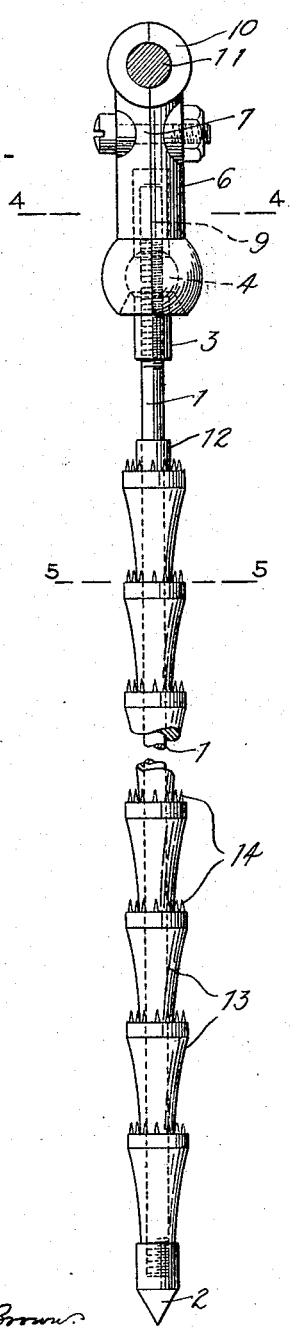
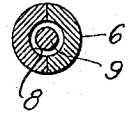
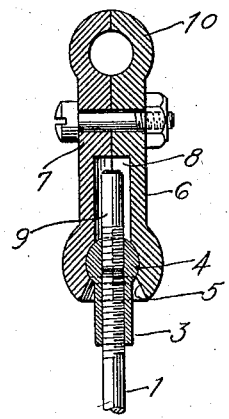
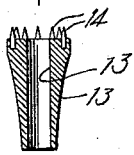
Witnesses:
Paul F. Brown
Geo B Rawlings
Inventor:
LEON W. CAMPBELL
Attorney

UNITED STATES PATENT OFFICE.

LEON WM. CAMPBELL, OF BOSTON, MASSACHUSETTS.

PICKER-STEM.

1,277,852.     Specification of Letters Patent.     Patented Sept. 3, 1918.

Application filed March 12, 1915. Serial No. 13,862.

*To all whom it may concern:*

Be it known that I, LEON W. CAMPBELL, a citizen of the United States, residing at Boston, county of Suffolk, Commonwealth of Massachusetts, have invented certain new and useful Improvements in Picker-Stems, of which the following is a specification.

This invention relates to cotton picking machines and particularly to the picker stems therefor.

My present invention is designed for use in connection with a cotton picking machine wherein spaced groups of picker stems are loosely suspended in series from a rotating carrier, and are carried through a cycle in which they are successively lowered, drawn through the plants, raised, inverted, doffed and restored to original position.

The present invention contemplates certain improvements in the picker stem construction whereby to secure an efficient picking action without damaging the plants and a positive doffing of the stem when inverted.

In the embodiment of my invention selected as an illustration, the picker stem consists of a rod member and a gang of removable and replaceable picker units detachably secured to said rod. The rod member has a connection with the support from which it depends permitting it a universal swinging movement relative to the support, and has an adjustment whereby its effective length may be varied. The picker unit gang is shiftable along the stem a limited distance by the reversal of the stem for doffing. The jarring effect produced when the sliding movement of the gang is stopped loosens the cotton fibers engaged by the picker units and assists the doffing. Each picker unit preferably consists of a tapered sleeve having a longitudinal bore to receive the rod member and an annular series of pointed picker elements set concentric to said bore in the end face of the enlarged portion of said tapered sleeve.

These improvements together with the advantages and features of merit which they secure and the construction and operation of my device will be more fully disclosed in the specification which follows. In the drawings I have shown as an illustrative embodiment a form of picker which has proven satisfactory in use and well adapted to the requirements of manufacture. Throughout specification and drawings like reference numerals are correspondingly applied and in these drawings:

Figure 1 is an elevation of a picker stem in accordance with my invention,

Fig. 2 is a view at right angles to Fig. 1 of the upper end of the stem,

Fig. 3 is a section on the line 3—3 of Fig. 2.

Figs. 4 and 5 are detail sections on the lines 4—4 and 5—5 respectively of Fig. 1 and Fig. 6 is a detail section on the line 6—6 of Fig. 5.

I have indicated at 1 a stem or rod upon which the removable and replaceable picker unit gang is preferably slidably mounted. The rod 1 is threaded at its lower end to receive a pointed ferrule 2 whereby the stem may descend among the plants without breaking them. The upper end of the rod is threaded into a sleeve 3 having an enlarged circular head or ball 4 at its upper end. The ball 4 is received in a correspondingly shaped socket 5 in the enlarged lower end of a two part T coupling 6, the parts of which are fastened together by a bolt or other fastening 7. The ball and socket joint 4—5 permits the stem universal swinging movement relative to the coupling 6.

Above the socket 5 the split coupling is hollow as indicated at 8 to receive a short stem 9 having its lower end threaded to fit in a threaded bore through said head 4. The stem 9 is alined with the rod 1 and is adjustable toward and from the rod to permit the effective length of the rod to be varied.

The cross head 10 of the split coupling receives a supporting rod 11 from which the picker stems are suspended in series.

On the rod 1 and confined between the ferrule 2 and a collar 12 near the upper end of the rod, is a gang of removable and replaceable downwardly tapered abutting sleeves 13. These sleeves are preferably slidable on the stem having a short travel as the stems are reversed. The upper enlarged end of each sleeve has an annular series of holes drilled in its upper face concentric to the longitudinal bore $13^1$ therethrough for the rod 1. Set in said holes is a plurality of upwardly extending pointed pins 14 which engage and separate the fiber from the bolls of the cotton plants. The annular series of pins on each sleeve or unit is "covered" or protected by the overhang of the enlarged end of the sleeve next above it, but is accessibly exposed to the fiber by the taper of the next sleeve which slopes in and terminates within the circle of the pins themselves. When the picker stem is reversed, the sleeves slide along the rod 1 until the collar 12 contacts the lower end of the sleeve 3. This brings the sliding sleeves 13 to an abrupt stop and tends to loosen and dislodge the cotton from the picking elements 14. As stated above, the shifting feature of the collar gang 12 is preferable but the gang may be set tight on the stem if preferred. The stems may be positively doffed, usually by being brought beneath a blower, but the jarring action described is effective in that it loosens the cotton fibers caught by the teeth. The ferrule 2 stops the movement of the sleeves 13 in the opposite direction when the stem is restored to its original position.

Various modifications in the form and construction of my device may obviously be resorted to within the limits of the appended claims.

What I therefore claim and desire to secure by Letters Patent is:

1. A picker stem comprising a stem rod and a picker gang of removable and interchangeable picker units shiftable mounted thereon.

2. A picker stem comprising a stem rod and a picker gang of removable and interchangeable picker units slidably mounted thereon in superposed concentric relation.

3. A picker unit for the stem of a cotton harvester comprising a sleeve having a longitudinal bore through which said stem passes, said sleeve having one face thereof provided with an annular series of uni-directionally pointed engaging elements set concentric to said bore with their lengths disposed substantially parallel to the stem.

4. A picker unit for the stem of a cotton harvester comprising a tapered sleeve having a longitudinal bore and an annular series of engaging elements set concentric to said bore on the end face of the larger end of said tapered sleeve.

5. An invertible picker stem, comprising a stem member, a gang of removable and replaceable picker units slidably mounted thereon in superimposed abutting relation, an annular series of unidirectional engaging elements on a face of each picker unit, and means for limiting the sliding movement of said gang in each direction.

6. An invertible picker stem, comprising a mount for a stem member, a gang of shiftable picker units on said stem member arranged to contact with said mount when the stem is inverted, whereby to loosen the cotton engaged on said units.

7. In an invertible picker stem, comprising a mount, a stem member having a universal movement relative to said mount, means providing for the longitudinal adjustment of said stem member, and a gang of removable and replaceable picker units shiftable on said stem and arranged to contact said mount when the stem is inverted whereby to loosen the cotton engaged on said units.

8. In a picker stem, a stem member, a series of longitudinally spaced, annular gangs of picking devices on said stem, a coupling therefor connectible to a support, and means including a ball and socket connection between said member and coupling whereby said stem may have universal movement relative to said coupling.

9. In a picker stem, a stem member, a series of longitudinally spaced, annular gangs of picking devices on said stem, a coupling therefor connectible to a support, and means including a ball and socket connection between said member and coupling whereby said stem may have universal movement relative to said coupling and an adjustable member alined with said stem member and by means of which the effective length of said stem member may be varied.

10. In a picker stem, a stem member, a split coupling for connecting said stem member to a support, said coupling having a socket, a sleeve having a head fitting said socket, said sleeve adjustably supporting said stem, and a short stem disposed within said coupling in alinement with said picker stem member and adjustable in said head of the sleeve, whereby the picker stem can be adjusted longitudinally.

11. In a picker stem, a stem rod, a coupling therefor, a universal joint between said stem rod and coupling, means whereby an adjustment for the length of said stem rod may be secured, and a gang of removable and replaceable picker units mounted on said stem, each unit comprising a tapered member having a longitudinal bore to receive said stem rod and having an annular series of engaging elements set concentric to said bore.

12. In a picker stem, a stem rod, a coupling therefor, a universal joint between said stem rod and coupling, means whereby an adjustment for the length of said stem rod may be secured, and a gang of removable and replaceable picker units mounted on said stem rod.

13. A picker unit for a picker stem consisting of an annular series of longitudinally disposed uni-directionally pointed engaging elements and a tapering carrier in the head of which said elements are mounted.

14. In a picker stem, a stem rod, a picker unit slidably mounted thereon, and an annular series of uni-directionally pointed engaging elements mounted on said unit in concentric relation to said rod.

15. In a cotton-harvesting machine, in combination, a split T-coupling engageable with a support, and a picker stem mounted in said coupling.

16. In a cotton-harvesting machine, in combination, a T-coupling engageable with a support, a picker stem mounted in said coupling and a universal joint between said coupling and stem.

17. In a picker stem, a stem member, and a plurality of tapered picker units arranged thereon in superimposed relation, each unit having a series of engaging elements on the larger face thereof and the elements of one unit disposed within the line of greatest circumferential area of the unit next adjacent whereby to be protected thereby.

18. A picker unit for a picker stem consisting of a conoidal member having a series of unidirectionally pointed picking elements on the larger end thereof.

19. A picker stem, comprising a rod, a plurality of adjacent superposed conoidal picker units thereon, and a series of unidirectionally pointed picking elements on the larger end of each unit and disposed within the overhang of the adjacent unit so as to be protected thereby.

20. A picker stem comprising a stem member, a plurality of superposed picker units thereon, each unit having an enlarged end, and a series of engaging elements on the enlarged end of each unit and disposed within the overhang of the enlarged end of the adjacent unit to be protected thereby, said units tapering toward their opposite ends to expose the engaging elements laterally to the fiber.

21. A picker stem comprising a stem member, a plurality of superposed picker units thereon, each unit having an enlarged end, and an annular series of engaging elements on the enlarged end of each unit and disposed within the overhang of the enlarged end of the unit next above to be protected thereby, said units tapering toward their opposite ends and terminating within the annular series of engaging elements to expose the engaging elements laterally to the fiber.

22. In a picker stem a plurality of units each comprising a tapered sleeve, a series of needles set concentric to the sleeve on the end face of the larger end of each, said sleeves being disposed with the smaller end of one against the larger end of the other and means upon which said units are axially alined.

23. A picker stem comprising a plurality of tapered sections disposed with the larger end of one to the smaller end of the other and an annular series of needles set concentric to the same and disposed on the end face of the larger end of each tapered section and means upon which said units are axially alined.

24. A cotton picker comprising a series of superposed elongated sections of varying cross-section from end to end, and pointed picking means disposed longitudinally within the area of the larger diameters of said sections and beyond the area of the smaller diameters thereof, there being between the smaller and larger diameters of the sections a series of relatively long circumferential recesses along the picker surface to permit the fiber of a cotton boll to readily overlap the pointed means.

25. A picker stem comprising a rod, a plurality of picker units mounted in adjacent superposed coaxial relation thereof, and each unit of varying cross-section from end to end to leave a circumferential recess in which the fiber of a cotton boll may readily enter, and a gang of picker points on each unit disposed in position to effectively engage the fiber.

26. In combination, a mount, an invertible stem member carried thereby and a gang of superposed picker units on said stem member and slidable toward said mount when the stem is inverted, said mount acting as a stop to limit the sliding movement by contact with the adjacent picker unit and such contact and the contact of the picker units upon one another in said sliding action loosening the cotton engaged on said units.

27. A mount for a picker stem including a support, a T-coupling engaging said support and carrying a series of picker units.

28. A mount for a picker stem comprising a support and a rocking coupling engaging said support, said coupling adjustably and detachably receiving a stem portion.

In testimony whereof I affix my signature in presence of two witnesses.

LEON WM. CAMPBELL.

Witnesses:
VICTORIA LOWDEN,
MARION C. HOBBS.